Dec. 21, 1948.  W. H. MORSE  2,456,983
DAMPER-WINDING FLEXIBLE CONNECTIONS
Filed Oct. 7, 1947

WITNESSES:

INVENTOR
William H. Morse.
BY
ATTORNEY

Patented Dec. 21, 1948

2,456,983

UNITED STATES PATENT OFFICE 2,456,983

DAMPER-WINDING FLEXIBLE CONNECTIONS

William H. Morse, Pittsburgh, Pa., assignor to Westinghouse Electric Corporation, East Pittsburgh, Pa., a corporation of Pennsylvania Application October 7, 1947, Serial No. 778,380

2 Claims. (Cl. 172—120)

My invention relates to the design of the damper-windings or amortisseur starting-windings for high-speed, high-inertia synchronous motors, wherein the high inertia of the motor and the motor-driven machine necessitates a prolonged starting-period during which there is excessive heating in the damper-winding, and in which the high speed of the motor imposes high centrifugal forces on the damping winding, as well as other rotating parts of the motor. My invention has particular relation to a novel design of flexible connections between the damper-segments of successive rotor-poles of the motor.

The object of my invention is to provide an extremely simple, inexpensive, and yet effective, type of flexible connection, which I believe to be new.

A more specific object of my invention is to provide connections which are flexible, even though they compose a copper section which is adequate for a high current-capacity and a permissible temperature-rise.

A further object of my invention is to provide connections which are sufficiently flexible so that thermal expansions of the damper-segments or of the connections themselves, due to the high temperature-rise therein, do not impose high mechanical loads or strains on the damper-bars or on the connections.

A still further object of my invention is to provide flexible connections, in the form of a stack of thin conductor-strips, which are arched or rolled to a particular radius, such that the ends of the connections are tangent to the damper-segments at the joints, so that the centrifugal forces operating on the connections causes a minimum of bending of the connections at their ends where they are attached to the damper-segments.

Figure 1:
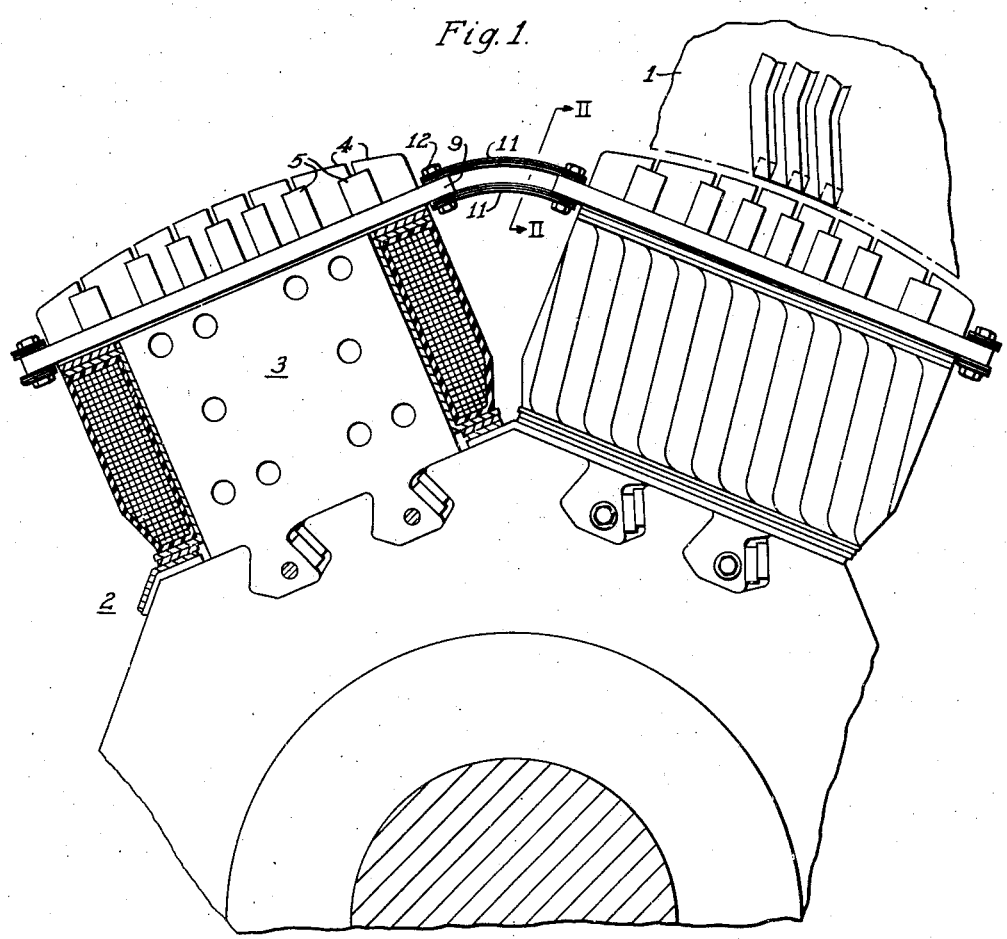
Figure 2:
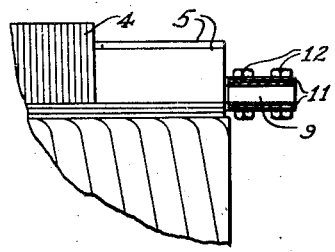

With the foregoing and other objects in view, my invention consists in the structures, combinations, assemblies, parts and methods of manufacture and assembly, hereinafter described and claimed, and illustrated in the accompanying drawing, wherein Fig. 1 is an end elevational view of a portion of an 8-pole synchronous motor embodying my invention by way of example, and Fig. 2 is a fragmentary sectional view through a terminal of one of the flexible connections on the plane indicated by the line II—II in Fig. 1.

The drawing shows my invention applied, by way of example, to a large synchronous motor having a primary-winding stator-member 1, which may be of a usual construction, and a field-winding rotor-member 2, having eight salient poles 3, so that the machine operates at 900 R. P. M. on a 60-cycle system, which is a fairly high speed for a machine of its size (5000 H. P.).

In the pole-face portions 4 of the salient poles 3, there are disposed damper-winding bars 5. The damping bars 5 for each salient pole have extending ends which extend axiallay beyond the pole-piece, and the undersides of these extending ends of the damping bars 5 are secured to damper-segments 9, a damper-segment being provided at each end of each salient pole 3.

In accordance with my present invention, the adjacent ends of the several segments, at each end of the machine, are joined by separate flexible connectors 11, each separate connector comprising an arched or rolled stack of thin conductor-strips, preferably of copper. The radius to which these several connector-stacks are arched or rolled or bent is such that the respective ends of each stack are substantially tangent to the ends of the respective damper-segments to which they are connected. Preferably, there are two separate flexible connectors 11 between each pair of damper-segments, one flexible connector lying above the segments, and one lying below the segments, the two connections being secured by common bolts 12 extending, in a substantially radial direction, through the ends of the connections and the ends of the damper-segment, to clamp the same tightly together.

My invention is particularly adapted for application to a synchronous machine having a design in which the damping bars 5 and the damper-segments 9 are sufficiently stiff to withstand their own centrifugal forces, without imposing a strain, for that purpose, on the several connectors, so that the connectors take no part in the mechanical strengthening or supporting of the damping bars or the damper-segments.

My new flexible-connection design has proved, in service, to be quite effective, while being, at the same time, of the utmost simplicity and low cost.

While I have illustrated my invention in but a single illustrative form of embodiment, I wish it to be understood that various changes may be made in details without departing from the essential spirit of the invention, and I desire that the appended claims shall be accorded the broadest construction consistent of their language.

I claim as my invention:

1. A dynamo-electric machine having a salient-pole rotor, damping bars in the pole-face portions of the salient poles, a damper-segment at each end of each salient pole, each damper-segment being secured to the undersides of the extending ends of its damping bars, and separate flexible connectors between the adjacent ends of the several segments at each end of the machine, each separate connector comprising an arched stack of thin conductor-straps having the respective ends of said stack bolted to an end of a damper-segment with one or more radially extending bolts.

2. The invention as defined in claim 1, characterized by said damping bars and damper-segments being sufficiently stiff to withstand their own centrifugal forces without imposing a strain for that purpose on the several connectors.

WILLIAM H. MORSE.

No references cited.